(12) United States Patent  (10) Patent No.: US 8,601,503 B2
Li et al.  (45) Date of Patent: Dec. 3, 2013

(54) DETECTING DISTRIBUTION OF MULTIMEDIA CONTENT

(71) Applicant: AT&T Intellectual Property I, L.P., Atlanta, GA (US)

(72) Inventors: Zhi Li, Martinez, CA (US); Dipak Ghosal, San Ramon, CA (US); Canhui Ou, Danville, CA (US); Raghvendra Savoor, Walnut Creek, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/691,444

(22) Filed: Nov. 30, 2012

(65) Prior Publication Data

US 2013/0088998 A1     Apr. 11, 2013

Related U.S. Application Data

(63) Continuation of application No. 13/083,941, filed on Apr. 11, 2011, now Pat. No. 8,359,609, which is a continuation of application No. 11/940,768, filed on Nov. 15, 2007, now Pat. No. 7,945,924.

(51) Int. Cl.
*H04H 60/33*     (2008.01)

(52) U.S. Cl.
USPC ........ 725/9; 725/14; 725/18; 725/19; 725/20; 726/26; 726/32; 380/201; 380/231; 706/51

(58) Field of Classification Search
None
See application file for complete search history.

(56) References Cited

U.S. PATENT DOCUMENTS

| | | |
|---|---|---|
| 5,594,796 A | 1/1997 | Grube et al. |
| 5,822,676 A | 10/1998 | Hayashi et al. |
| 6,330,285 B1 | 12/2001 | Crosby et al. |
| 6,381,747 B1 | 4/2002 | Wonfor et al. |
| 6,484,203 B1 | 11/2002 | Porras et al. |
| 6,574,610 B1 | 6/2003 | Clayton et al. |
| 6,865,675 B1 | 3/2005 | Epstein |
| 7,124,114 B1 | 10/2006 | Hollar |
| 7,296,288 B1 | 11/2007 | Hill et al. |
| 7,545,748 B1 | 6/2009 | Riddle |
| 2001/0039582 A1 | 11/2001 | McKinnon et al. |
| 2001/0041989 A1 | 11/2001 | Vilcauskas, Jr. et al. |
| 2001/0051996 A1 | 12/2001 | Cooper et al. |
| 2002/0129140 A1 | 9/2002 | Peled et al. |
| 2002/0152262 A1 | 10/2002 | Arkin et al. |
| 2002/0156743 A1 | 10/2002 | DeTreville |
| 2003/0188318 A1 | 10/2003 | Liew et al. |
| 2004/0019900 A1 | 1/2004 | Knightbridge et al. |
| 2004/0111611 A1 | 6/2004 | Jin et al. |
| 2004/0228277 A1 | 11/2004 | Williams |
| 2005/0086062 A1 | 4/2005 | Clark et al. |
| 2006/0048237 A1 | 3/2006 | Luo et al. |
| 2006/0067215 A1 | 3/2006 | Elliott et al. |
| 2006/0171392 A1 | 8/2006 | Jen et al. |
| 2006/0239503 A1 | 10/2006 | Petrovic et al. |
| 2006/0294382 A1 | 12/2006 | Krasinski |
| 2007/0033146 A1 | 2/2007 | Hollar |
| 2007/0033531 A1 | 2/2007 | Marsh |
| 2007/0067242 A1 | 3/2007 | Lotspiech et al. |
| 2007/0094725 A1 | 4/2007 | Borders |
| 2007/0220266 A1 | 9/2007 | Cooper et al. |

*Primary Examiner* — Brian Pendleton
*Assistant Examiner* — Fernando Alcon
(74) *Attorney, Agent, or Firm* — Jackson Walker L.L.P.

(57) ABSTRACT

A system and method is disclosed for detecting distribution of multimedia content. The volume level of data traffic is monitored for a plurality of users to select any users with high-bandwidth usage. The time of day and the day of the week may be considered when determining whether a user is a high-bandwidth user. Upon selecting a user as one with high-bandwidth usage, such user may be subject to packet inspections of data traffic streams. In some embodiments, content identification parameters or watermarks are added to one or more packets in a data traffic stream carrying multimedia content.

19 Claims, 3 Drawing Sheets

FIG. 3

DETECTING DISTRIBUTION OF MULTIMEDIA CONTENT

The present patent application is a continuation of U.S. patent application Ser. No. 13/083,941, filed Apr. 11, 2011, which is a continuation of U.S. patent application Ser. No. 11/940,768, filed Nov. 15, 2007, the entirety of which are both hereby incorporated by reference.

BACKGROUND

1. Field of the Disclosure

The present disclosure generally relates to content provider networks and more particularly to systems and methods for detecting redistribution of multimedia content.

2. Description of the Related Art

Multimedia content such as video-on-demand movies may be recorded by users and then redistributed to others illegally or without the authorization of the applicable owners of such content in violation of copyright laws.

DESCRIPTION OF THE EMBODIMENT(S)

In one aspect, a method is disclosed for detecting distribution of multimedia content. The method comprises monitoring a volume of data traffic for each of a plurality of users. Such monitoring results in a volume parameter for each of the plurality of users. The method further includes selecting a portion of the plurality of users with volume parameters that meet a predetermined condition. The method further comprises inspecting a data traffic stream for each of the selected users, wherein each traffic stream is searched for a content identification parameter.

In another aspect, a distribution detector application stored on a computer readable medium is disclosed. The distribution detector application has instructions operable for tracking a volume of data traffic for a user. The distribution detector application further has instructions operable for comparing the volume of upstream traffic to a threshold volume. If the volume meets or exceeds the threshold volume, then further instructions are operable for analyzing an ordering history of the user and comparing an estimated volume of traffic associated with the ordering history to the volume of data traffic. If the volume of data traffic meets or exceeds the estimated volume of traffic associated with the ordering history, then further instructions are operable for comparing an identification parameter associated with the volume of traffic with one or more known identification parameters.

An additional disclosed system is for detecting distribution of multimedia content. The system comprises one or more data processing systems configured to attach a content identification parameter to a portion of the multimedia content. The data processing systems are further configured to profile a plurality of users to identify a portion of the plurality of users with high bandwidth usage. The data processing systems are further configured to track an ordering history parameter for each of the portion of the plurality of users with high bandwidth usage to determine whether user has an order history parameter below a threshold. For any user with an order history parameter below a threshold, the data processing systems are further configured to inspect an upstream traffic stream from an appliance associated with the user for the content identification parameter.

In the following description, for the purposes of explanation, numerous specific details are set forth in order to provide a thorough understanding of the disclosed embodiments. A person of ordinary skill in the art should recognize that embodiments might be practiced without some of these specific details. In other instances, well-known structures and devices may be shown in block diagram form or omitted for clarity.

Television programs, movies, radio programming and other multimedia content may be distributed over telephone company networks, coaxial-based networks, satellite transmissions, WiFi transmission, WiMAX transmission, and the like. In some systems, for example traditional coaxial-based "cable" systems, a service provider may distribute through the same coaxial or fiber-optic cable a compound signal containing a number of television channels at different frequencies. In conjunction, a set-top box or a tuner within a television, radio, recorder or similar device selects one or more channels from the compound signal to play or record. In contrast to such systems that simultaneously distribute every available channel at all times, IPTV systems generally distribute content only in response to user requests. Such IPTV systems typically use Internet Protocol (IP) and other technologies found in computer networks. To provide IPTV, a user's telephone lines may, for example, be used in some combination with a residential gateway (RG), a digital subscriber line (DSL) modem, a set-top box (STB), a display, and other such equipment to receive and convert into usable form the multimedia content provided from a telephone company network.

IPTV providers, satellite-based providers, digital cable providers, and other multimedia content providers may distribute multimedia content using bidirectional (i.e., two-way) communication between a user's customer premises equipment (CPE) and the service provider's equipment. Bidirectional communication allows a service provider to offer advanced features, such as video-on-demand (VOD), pay-per-view, advanced programming information, text-based news, and the like.

Once multimedia content such as movies are distributed to a user's CPE such as a digital video recorder or personal computer, it may be possible for the user to redistribute the multimedia content in violation of copyright laws, for example. Although time-shifting benefits associated with recording multimedia content for personal use are generally well-recognized and accepted, redistribution of copyrighted material for display by other, unlicensed users may prevent a content provider or other applicable entity from receiving owed fees and royalties. In order to detect the potential redistribution of multimedia content such as VOD movies, embodied systems and methods profile users by performing volume-level analysis. If a user or subscriber has a particularly high level of upstream or downstream traffic flowing from or to his or her CPE, then the user may be flagged as a potential distributor or recipient of bootlegged or unauthorized multimedia content. Distributing and receiving multimedia content requires high-bandwidth, and determining the amount of bandwidth used by a person and comparing it to the bandwidth used by others can help a content provider to narrow the number of users that may receive further consideration or analysis. After volume-level analysis, a profiling algorithm may be implemented that tracks the viewing and ordering history of a user or subscriber. If a user or subscriber has ordered a large number of VOD movies, then the user may be expected to have a large amount of downstream traffic. If the user also has a large volume of upstream traffic, then a content provider may consider the user or subscriber as a potential distributor of multimedia content. After volume-level analysis and profiling of ordering histories is completed, a matching algorithm may be performed to determine whether content identification parameters, fingerprints, watermarks, or other security parameters are attached to or otherwise included within the video streams sent or received from or to a user. Accordingly, disclosed embodiments are utilized for aiding in detecting the possible redistribution of multimedia content such as VOD movies.

Content-level matching may occur based on wavelets. Video frames from video servers may be analyzed by considering sequences of certain sizes starting at specific sequence numbers. Wavelet transforms may be performed of the sequences and a determination made of the coefficients at different resolutions. The coefficients at different resolutions may be stored. For outgoing streams from subscribers (i.e., upstream traffic) sequences of the same size may be considered and wavelet transforms performed to determine the coefficients. The coefficients may be compared to determine whether a match occurs.

Content-level matching may be a resource-intensive operation. Volume-level pruning significantly reduces the set of subscribers that are analyzed using content-level matching, which may examine the content of packets or datagrams associated with a multimedia stream to determine whether the content was previously tagged or appended with any security features. Subscriber content profiling further reduces the set of users to compare for content-level matching.

Subscriber content profiling also may be used to narrow the field of redistribution inquiries. With subscriber content profiling, redistribution detection efforts may be focused upon users that request or distribute very popular or recent movies, for example. Accordingly, embodied systems may track distribution of popular multimedia content across all subscribers for a recent period (e.g., last week). This may be done by tracking the ordering history of all subscribers, tracking channel-changing, tracking VOD ordering history, and tracking on-demand content downloads for each individual subscriber for a recent period (e.g., last week). A content signature module operating within an IPTV distribution system may be utilized to watermark popular content so that piracy detection efforts may be focused on popular content that is more likely to be copied. In some embodiments, for any subscribers targeted by volume-level pruning, performing content-level matching may be performed on multimedia content identified during subscriber content profiling. Embodied systems may be used by content providers to assist movie studios, for example, to find probable unlawful distributors of multimedia content.

Figure 1:
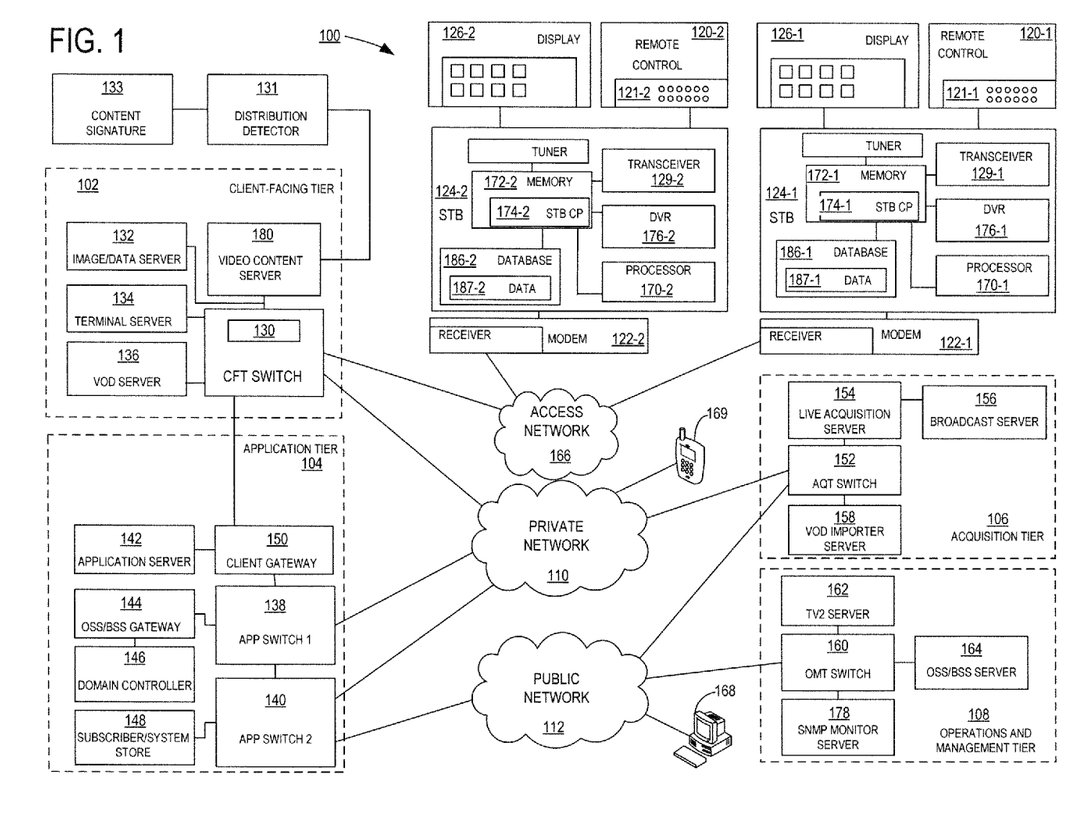
FIG. 1 illustrates a representative Internet Protocol Television (IPTV) system for implementing some disclosed embodiments.

Referring now to the drawings, FIG. 1 illustrates selected aspects of an IPTV system 100 operated as part of a service provider network (e.g., content provider network). Throughout this disclosure, a hyphenated form of a reference numeral refers to a specific instance of an element and the un-hyphenated form of the reference numeral may refer to the element generically or collectively. Thus, for example, reference numeral 124-1 refers to an instance of an element 124. As shown in FIG. 1, IPTV system 100 includes two set-top boxes (STBs) 124 including set-top box 124-1 and set-top box 124-2. In the depicted embodiment, STB 124 communicate through access network 166 via modems 122 (i.e., modem 122-1 and modem 122-2).

As shown, IPTV system 100 is configured to provide multimedia content to users of set-top boxes 124 and includes a client-facing tier 102, an application tier 104, an acquisition tier 106, and an operations and management tier 108. In addition, IPTV system 100 may provide multimedia content to personal computer (PC) 168 and mobile device 169, which may be a mobile telephone. Each tier 102, 104, 106 and 108 is coupled to a private network 110, to a public network 112 (e.g., the Internet), or to both the private network 110 and the public network 112. Any of the various tiers coupled to the various networks may communicate with each other over the networks. For example, as shown, the client-facing tier 102 may communicate through the private network 110 with the acquisition tier 106. Further, as shown, the application tier 104 may communicate through the private network 110 and the public network 112 with the acquisition tier 106. The interconnections between illustrated tiers and networks in FIG. 1 are meant as instructive and not limiting.

As shown, IPTV system 100 distributes multimedia content to users of set-top boxes 124 for viewing on displays 126 and possibly for sending to other components not shown, such as stereo equipment. In addition, users may attempt to illegally redistribute copyrighted multimedia content to other users, which should be detected and prevented when possible. In order to distribute the multimedia content, IPTV system 100 must first gain access to the multimedia content. To that end, acquisition tier 106 represents a variety of systems to acquire multimedia content, reformat it when necessary, and prepare it for transmission over private network 110 or public network 112. In its capacity at acquiring and distributing multimedia for use on IPTV system 100, acquisition tier 106 serves as a "content headend." Acquisition tier 106 may include, for example, systems for capturing analog and/or digital content feeds, either directly from a content provider or from a content aggregation facility. Content feeds transmitted via VHF/UHF broadcast signals may be captured by broadcast server 156. Similarly, live acquisition server 154 may capture satellite signals, high-speed fiber feeds, or programming feeds sent over other suitable transmission means. Content feeds to live acquisition server 154 may include broadcasted multimedia content, for example premium audio/video programming (i.e., traditional "cable channels") widely available but not typically broadcast over airwaves. Acquisition tier 106 may further include signal conditioning systems and content preparation systems for encoding content. As shown, acquisition tier 106 includes VOD importer server 158 and may include a digital rights management (DRM) server for encrypting content (not shown). VOD importer server 158 receives content from one or more VOD sources that may be outside the IPTV system 100, for example discs or transmitted feeds. VOD importer server 158 may temporarily store multimedia content for transmission to a VOD server 136 on client-facing tier 102. In addition, the VOD content may be stored at one or more servers, such as the VOD server 136. The stored VOD content may be distributed by multicast (i.e., a single stream sent simultaneously to multiple viewers) or by unicast (i.e., a single stream sent to individual users) in a VOD system.

After acquiring the multimedia content, IPTV system 100 distributes the content over private network 110, for example. Private network 110 may be referred to as a "core network." In some embodiments, private network 110 consists of a fiber backbone (i.e., WAN) and one or more video hub offices (VHOs). Generally, private network 110 transports multimedia content (e.g., video, music, Web pages, channel lineups, and data) from the acquisition tier 106 to set-top boxes 124 through access network 166 (via client-facing tier (CFT) switch 130). In this role, private network 110 serves as the "backbone" for IPTV system 100. In a large deployment of IPTV system 100 that covers a vast geographic region, private network 110 may represent several smaller networks that each may only transfer content within a subset of the region. Accordingly, private network 110 may provide for the insertion of local content that is relevant only to a subset region. For example, private network 110 may allow for the localized insertion of local advertisements or local emergency alert systems for a particular service area.

To illustrate the distribution of multimedia content acquired by acquisition tier 106, in an example embodiment, broadcast server 156 acquires broadcast multimedia content and communicates it to live acquisition server 154. Live acquisition server 154 transmits the multimedia content to the AcQuisition Tier (AQT) switch 152. In turn, the AQT switch 152 transmits the multimedia content to the CFT switch 130, for example, via the private network 110. As shown, the CFT switch 130 may communicate the multimedia content through modems 122 via the access network 166. In some embodiments, STBs 124 receive the multimedia content via modems 122 and transmit it to displays 126.

In some embodiments, live acquisition server 154 and VOD importer server 158 take numerous data streams and encode them into a digital video format, such as MPEG-2, or MPEG-4. After encoding, data streams may be encapsulated into IP data streams and transmitted to specific IP destinations (e.g., STBs 124) in response to a user's request for a particular channel, for example. Video content server 180, VOD server 136, or image/data server 132 may act as an intermediary or repository for multimedia content obtained and encoded by acquisition tier 106. In some embodiments, multimedia content is transmitted to the video content server 180, where it is encoded, formatted, stored, or otherwise manipulated and prepared for communication to the STB 124.

As shown, IPTV system 100 includes access network 166. Access network 166 provides a network link from the private network 110 to each user's location. To this end, access network 166 provides a network translation as necessary from a switched network, for example, to the access technology used to transmit data and multimedia content to the consumer's location. For example, a service provider that uses twisted-pair telephone lines to deliver multimedia content to consumers may utilize digital subscriber lines within access network 166. The digital subscriber lines may utilize some combination of DSL, DSL2, DSL2+, ADSL, VDSL or other technologies. In some embodiments, access network 166 may use fiber-to-the-home (FTTH). In such cases, optical fiber may be used all the way to the consumer's location to provide high-bandwidth. In other embodiments, fiber-to-the-curb (FTTC) deployments are used to deliver multimedia content to consumers. In such cases, a digital subscriber line access multiplexer (DSLAM) may be used within access network 166 to transfer signals containing multimedia content from optical fiber to copper wire for DSL delivery to consumers. In other embodiments, access network 166 may use radio frequency (RF) signals sent over coaxial cables. Accordingly, access network 166 may utilize quadrature amplitude modulation (QAM) equipment for downstream traffic. In these systems, access network 166 may receive upstream traffic from a consumer's location using quadrature phase shift keying (QPSK) modulated RF signals. In such systems, a cable modem termination system (CMTS) may be used to mediate between IP-based traffic on private network 110 and access network 166.

In operation, if a user requests VOD content via a STB 124, the request may be transmitted over the access network 166 to VOD server 136, via the CFT switch 130. Upon receiving the request, the VOD server 136 retrieves or accesses the requested VOD content and transmits the content to the STB 124 across access network 166 via CFT switch 130. In turn, STB 124 transmits relevant video portions of the VOD content to the display 126. STB 124 may transmit audio portions of the VOD content to a stereo system (not shown) or may allow (or disallow) sending the VOD content to a recording device (not shown).

As shown, IPTV system 100 includes application tier 104. Application tier 104 communicates with acquisition tier 106 and client-facing tier 102 through private network 110. Application tier 104 may communicate through various communication protocols including hypertext transfer protocol (HTTP). Generally, application tier 104 may include notification servers, billing servers, and any of a variety of subscriber application servers employed by an owner or operator (i.e., network service provider) of IPTV system 100. In some embodiments, elements of the application tier 104 such as client gateway 150 communicate directly with the client-facing tier 102. The components of client-facing tier 102 may communicate using HTTP, transmission control protocol (TCP) or datagram protocol (UDP), as examples.

The TCP/IP protocol suite may be used to form frames or packets that make up a distributed multimedia stream. Upon the formation of frames or packets, a transport layer header which may be a TCP or UDP is typically appended to each frame or packet. The transport layer in the TCP/IP protocol stack is responsible for the delivery of packets. In many cases, a header includes a destination port field with a numeric entry that defines the data being transported. Data (e.g., multimedia content) may be encapsulated with a transport header that identifies the data (e.g., multimedia content). Once encapsulated, a TCP segment or UDP datagram may be passed to the network layer. Some disclosed embodiments attached a signature, content identification parameter, watermark or other security parameter to a header during encapsulation. Such security parameters may include a recipient identification parameter related to the person, computer, or account to which the content is originally sent. This helps in tracking the content upon possible redistribution. Recipient identification parameters may include computer serial numbers, consumer credit card numbers, or network interface card IP addresses. In some embodiments, security features that aid in tracking are embedded in the content of packets or files to make tracking and removing of the security features more difficult.

If the multimedia content is audio content, sequences of frames may be analyzed to determine whether a stream contains a particular song, for example. A frame may consist of a group of audio samples that are processed together to determine a frequency spectrum. The frequency spectrums may be compared and analyzed against samples of known songs to determine whether any known songs are being sent within a file stream.

Referring again to FIG. 1, the client-facing tier 102 is coupled for communication with user equipment (e.g., modems 122) via access network 166. Access network 166 may be referred to as the "last mile" for a service provider or network operator. It provides network connectivity of IPTV services to consumers' locations. Client-facing tier 102 may be required to multicast multimedia content to multiple destinations. For example, the same multimedia content may be distributed substantially simultaneously to STB 124-1 and STB 124-2. In contrast to a multicast or a unicast, some embodiments "broadcast" programming or data to all users on a network as a "broadcast" transmission. For example, a TV guide feature for displaying available programming may be broadcast to every user.

To deliver multimedia content, client-facing tier 102 may employ any current or future Internet protocols for providing reliable real-time streaming multimedia content. In addition to the TCP, UDP, and HTTP protocols discussed above, such protocols may use, in various combinations, other protocols including, file transfer protocol (FTP), real-time transport protocol (RTP), real-time control protocol (RTCP), and real-time streaming protocol (RTSP), as examples. In some embodiments, client-facing tier 102 sends multimedia content encapsulated into IP packets over access network 166. For example, an MPEG-2 transport stream may be sent, in which the transport stream consists of a series of 188-byte transport packets. To ensure quality of service, protocols should be chosen that minimize dropped packets, jitter, delay, data corruption, and other errors.

As shown, the client-facing tier 102 may communicate with a large number of set-top boxes, such as representative STBs 124, over a wide area, which may be for example, a regional area, a metropolitan area, a viewing area, a designated market area, or any other suitable geographic area, market area, or user group supported by networking the client-facing tier 102 to numerous set-top boxes. In an illustrative embodiment, the client-facing tier 102, or any portion thereof, may be included at a video headend office (not depicted).

In some embodiments, the client-facing tier 102 may be coupled to modems 122 via fiber optic cables. Alternatively, modems 122 may be DSL modems coupled to one or more network nodes via twisted pairs. Each STB 124 may process data received over the access network 166 via various IPTV software platforms that are commonly known.

In an illustrative embodiment, the client-facing tier 102 includes a CFT switch 130 that manages communication between the client-facing tier 102 and the access network 166. CFT switch 130 also manages communication between the client-facing tier 102 and the private network 110 and is coupled to an image/data server 132 that may store streaming multimedia content and possibly still images associated with programs of various IPTV channels. Image/data server 132 stores data related to various channels, for example, types of data related to the channels and to programs or video content displayed via the channels. In an illustrative embodiment, image/data server 132 may be a cluster of servers, each of which may store streaming multimedia content, still images, channel and program-related data, or any combination thereof. CFT switch 130 may also be coupled to terminal server 134 that provides terminal devices with a connection point to the private network 110. As shown, CFT switch 130 may also be coupled to VOD server 136 that stores or provides VOD content imported by the IPTV system 100. As shown, the client-facing tier 102 also includes video content server 180 that transmits video content requested by viewers to STBs 124. In some embodiments, video content server 180 includes one or more multicast servers.

As illustrated in FIG. 1, application tier 104 may communicate with numerous components through private network 110 and public network 112. As shown, application tier 104 includes a first application tier (APP) switch 138 and a second APP switch 140. The first APP switch 138 is coupled to the second APP switch 140 and a combination operation-systems-support (OSS) and billing-systems-support (BSS) gateway 144 (i.e., OSS/BSS gateway 144). In some embodiments, the OSS/BSS gateway 144 controls access to an OSS/BSS server 164 that stores operations and billing systems data.

As shown, application tier 104 includes application server 142. Application server 142 may be any data processing system with associated software that provides information services (i.e., applications) for clients or users. Application server 142 may be optimized to provide services including conferencing, voicemail, and unified messaging. In some embodiments, services include electronic programming guides (EPG), conditional access systems (CAS), DRM servers, a navigation/middleware server, and IPTV portal, e-mail services, and remote diagnostics.

Packet Switched Public Data Networks (PSPDN) are public data networks that interconnect data processing systems (e.g., computers) with each other to provide accessibility and exchange of data including multimedia content. The Internet is an example of a public data network that uses IP for transporting data including multimedia content from one data processing system to another data processing system using data packets. Data packets transmitted over the Internet find their way through network switching nodes (e.g., computers) that forward received packets to other data processing systems and nodes until a packet reaches its destination data processing system. Each node may contain routing tables to provide packet forwarding information.

Multimedia content may be digitized and transferred using packets, which are small groups of digital bits that are routed through a network to a destination STB, computer, or other similar data processing system. Packets may be transmitted through a packet buffer, which may contain memory spaces for storing packets that are awaiting transmission. Packet buffers may also be used for storing a received packet. The memory used for packet buffers may be located in a network interface controller, a router, or other data processing system. Packet buffering may be used to reduce the effects of packet delays and packet loss when streaming multimedia content. In accordance with disclosed embodiments, video content and other multimedia content may be stored in one or more packet buffers for later (i.e., not real-time) content analysis to detect illegal distribution.

Packet encapsulation relates to inserting the contents of a data packet into the data portion (i.e., payload) of another packet. In accordance with disclosed embodiments, signatures, identification parameters, watermarks or other security identifiers may be placed in a packet header during packet encapsulation. Packet filters may also be used to inspect packets or alter the content of packets during encapsulation. In addition, a packet header may be altered to add security identifiers, for example.

A packet assembler and disassembler (PAD) may be any packet data system that converts data files to and from packets of digital information. A large file may be sent over a packet data network by supplying the file to a PAD circuit that divides the data file into smaller packets that are sent towards a destination data processing system through a data network. Packet data systems may use an address (e.g., IP address) contained in the header of each packet to dynamically route these packets through a switching network to their ultimate destination. When the packets are received, they may be reassembled into the original large data file by a packet assembler. In accordance with disclosed embodiments, during conversion of a data file into packets (i.e., during packet assembly), watermarks or security identifiers may be placed in a header or within each packet to allow for identifying the packets in case they are later distributed. Accordingly, disclosed embodiments may operate by placing a watermark on packets that transport multimedia content. Watermarking is a process of embedding or adding information to a file or packet. Watermarking may be used to identify the media as authentic or to provide a means for tracking the identity of a packet as part of a protected file. A watermark may be any imperceptible signal hidden in another signal, such as a multimedia content stream, that carries data or information. To enhance security, watermarks are preferably imperceptible by programs intended to overcome watermarking protection by destroying watermarks. A watermark extractor is a filter that may be a software program that is enabled for separating a watermark from a file or packet. In some cases, watermarks may be used to provide a key that is needed to decode and/or play a file.

As shown in FIG. 1, second APP switch 140 is communicatively coupled to a domain controller 146 that provides web access, for example, to users via public network 112. Second APP switch 140 is communicatively coupled to subscriber and system store 148 that includes account information, such as account information that is associated with users who access the IPTV system 100 via private network 110 or public network 112. Therefore, for example, a user may employ PC 168 to receive IPTV account information via public network 112. Similarly, a user may employ mobile device 169 or another similar multifunction device over private network 110 or public network 112 to receive information through second APP switch 140. In some embodiments, application tier 104 may also include client gateway 150 that communicates data directly with client-facing tier 102. In these embodiments, client gateway 150 may be coupled directly to the CFT switch 130. Accordingly, client gateway 150 may provide user access to private network 110 and tiers coupled thereto.

In some embodiments, STB 124 accesses IPTV system 100 via access network 166, using information received from client gateway 150. In such embodiments, access network 166 may provide security for private network 110. Therefore, user devices may access client gateway 150 via access network 166, and client gateway 150 may allow such devices to access private network 110 once the devices are authenticated or verified. Similarly, client gateway 150 may prevent unauthorized devices, such as hacker computers or stolen STBs, from accessing private network 110, by denying access to these devices beyond the access network 166.

Accordingly, in some embodiments, when a STB 124 accesses the IPTV system 100 via the access network 166, the client gateway 150 verifies user information by communicating with the subscriber/system store 148 via the private network 110, the first APP switch 138, and the second APP switch 140. The client gateway 150 verifies billing information and user status by communicating with the OSS/BSS gateway 144 via the private network 110 and the first APP switch 138. The OSS/BSS gateway 144 may transmit a query across the first APP switch 138, to the second APP switch 140, and the second APP switch 140 may communicate the query across the public network 112 to the OSS/BSS server 164. Upon the client gateway 150 confirming user and/or billing information, the client gateway 150 allows the STB 124 access to IPTV content, VOD content, and other services. If the client gateway 150 cannot verify user information for the STB 124, for example, because it is connected to an unauthorized twisted pair or residential gateway, the client gateway 150 may block transmissions to and from the STB 124 beyond the access network 166.

STBs 124 convert digital compressed signals into a format suitable for display. STBs 124 have functionality for recognizing and acting on IP packets, for example UDPs transmitted within IP datagrams. STBs 124 may contain software or firmware coding for sending requests to application server 142, for example, to receive requested programming or data. In some embodiments, requests for content (e.g., VOD content) flow through a billing or management server to verify that a user is not in arrears regarding payment. In some embodiments, STB 124 supports Web browsing on the Internet (e.g., public network 112) and may support cycling through guide data, for example, using Web services. Each STB 124 may be enabled for viewing e-mail, viewing e-mail attachments, and interfacing with various types of home networks.

In accordance with disclosed embodiments, each STB 124 may be a cable box, a satellite box, or an electronic programming guide box. Further, although shown separately, STBs 124 may be incorporated into any multifunctional device such as, a television, a videocassette recorder, a digital video recorder, a computer, a personal computer media player, or other media device. Generally, STBs 124 each represent a dedicated data processing system (e.g., computer) that provides an interface between a display and a service provider. As shown, STBs 124 are connected to the service provider through modems 122. Although modems 122 are shown in FIG. 1, other residential gateways may be employed. Alternatively, STBs 124 may be connected directly to access network 166.

STBs 124 contain software or firmware instructions stored in memories 172 or other storage for receiving and processing input from remote controls 120. In some embodiments, STBs 124 are IP based set-top boxes and have capability for outputting resultant multimedia signals (e.g., streaming audio/video) in various formats including S-video, composite video, high definition component video, high definition multimedia interface (HTMI), and video graphics array (VGA) signals. The resultant multimedia signals may support displays 126 that have various video modes including analog NTSC, 1080i, 1080p, 480i, 480p, 720p, as examples. In some embodiments, STBs 124 communicate with modems 122 over local area networks (LANs) connected using CAT5 cables, CAT6 cables, wireless interfaces, or a Home Phoneline Networking Alliance (HPNA) network, as examples.

As shown STBs 124 are coupled to displays 126. Each display 126 may include a cathode ray tube (CRT), television, monitor, projected image, liquid crystal display (LCD) screen, holograph, or other graphical equipment. STBs 124 communicate with remote controls 120. STBs 124 may include wireless transceivers 129 to communicate with wireless transceivers (not shown) of remote controls 120. Remote controls 120 may be used in conjunction with STBs 124 to operate graphical user interfaces (GUIs) displayed on displays 126.

STBs 124 may receive multimedia data including video content and audio content from the client-facing tier 102 via the access network 166. The multimedia content may be associated with a broadcast program that includes streaming multimedia content. The multimedia content may include VOD presentations and pay-per-view sporting events. A content provider may wish to detect any redistribution of the VOD presentations and pay-per-view sporting events, in accordance with disclosed embodiments. The multimedia content may also include pod casts, web casts, or audio files used for playing on portable audio devices, as examples. As it receives data that includes the multimedia content, STB 124 may store the content or may format the content into a resultant multimedia signal for sending to displays 126 and other equipment (not shown) for producing portions of the multimedia content in usable form.

As shown, each STB 124 includes an STB processor 170 and an STB memory 172 that is accessible by STB processor 170. An STB computer program (STB CP) 174, as shown, is embedded within each STB memory 172. As shown, memories 172 are coupled with databases 186 that each include data 187. In addition to or in conjunction with STB components illustrated in FIG. 1, STBs 124 may contain modules for transport, de-multiplexing, audio/video encoding and decoding, audio digital to analog converting, and radio frequency (RF) modulation. For clarity, such details for these modules are not shown in FIG. 1. In addition, details are not provided for allowing STBs 124 to communicate through access network 166 through modems 122. However, such communications can be carried out with known protocols and systems for network interfacing such as conventional network interface cards (NICs) used in personal computer platforms. For example, STB 124 may use a network interface that implements level 1 (physical) and level 2 (data link) layers of a standard communication protocol stack by enabling access to a twisted pair or other form of physical network medium and supporting low level addressing using media access control (MAC) addressing. In these embodiments, STBs 124 may each have a network interface including a globally unique 48-bit MAC address stored in a ROM or other persistent storage element. Similarly, each modem 122 (or other RG) may have a network interface (not depicted) with its own globally unique MAC address. Further, although STBs 124 are depicted with various functions in separate components, these components may be implemented with a system on chip (SoC) device that integrates two or more components.

As shown, STBs 124 may also include a video content storage module, such as a digital video recorder (DVR) 176. In a particular embodiment, STBs 124 may communicate commands received from the remote controls 120 to the client-facing tier 102 via the access network 166. Commands received from the remote controls 120 may be entered via buttons 121.

IPTV system 100 includes an operations and management tier 108 that has an operations and management tier (OMT) switch 160. OMT switch 160 conducts communication between the operations and management tier 108 and the public network 112. The OMT switch 160 is coupled to a TV2 server 162. Additionally, the OMT switch 160 as shown is coupled to an OSS/BSS server 164 and to a simple network management protocol (SNMP) monitor server 178 that monitors network devices within or coupled to the IPTV system 100. In some embodiments, the OMT switch 160 communicates with the AQT switch 152 via the public network 112.

In an illustrative embodiment, the live acquisition server 154 transmits the multimedia content to the AQT switch 152, and the AQT switch 152, in turn, transmits the multimedia content to the OMT switch 160 via the public network 112. In turn, the OMT switch 160 transmits the multimedia content to the TV2 server 162 for display to users accessing the user interface at the TV2 server 162. For example, a user may access the TV2 server 162 using a PC 168 coupled to the public network 112.

An IPTV system may contain elements such as a video headend, service provider IP network, service provider access network, and the home or residence network. If a consumer or user is downloading a movie or music video, for example, using the public Internet, a video headend may represent one enterprise or company and the service provider IP network may represent a series of IP networks interconnected at a peering point to form the Internet backbone. A service provider access network may represent an Internet service provider (ISP) and the home network may consist of a router and wireless LAN products that may be obtained from one or more manufacturers. In comparison, if the consumer accesses a movie or television show via a private IP network, the video headend, service provider IP network, and service provider access network may be provided by a single enterprise or company. Indeed, a single enterprise or company may provide end-to-end service including any required home networking equipment. Accordingly, embodied systems may be operated within and in conjunction with various components within an IPTV network. Further, the disclosed embodiments are meant as illustrative and not limiting.

Figure 2:
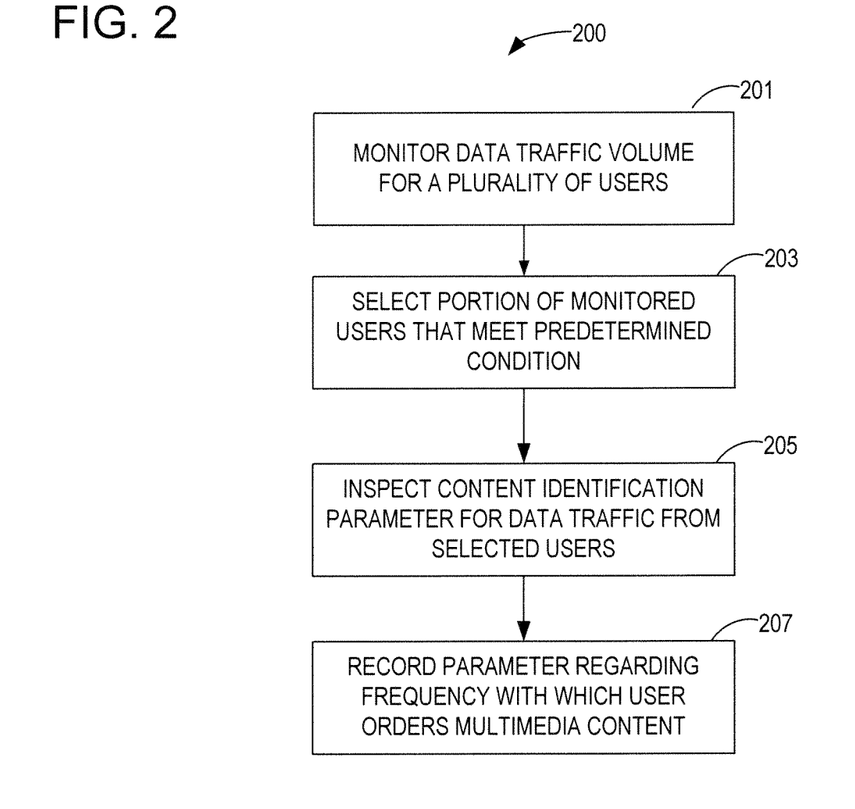
FIG. 2 illustrates representative operations relating to an embodied method.

FIG. 2 illustrates in block diagram form a methodology 200 for detecting redistribution of multimedia content. In operation 201, data traffic volume for a plurality of users is monitored. Volume level monitoring is performed by analyzing the number of packets sent upstream from a user's CPE, for example. A residential gateway, STB, or client application on a data processing system may be configured to monitor traffic levels and report to a distribution detector (e.g., distribution detector 131 in FIG. 1). In other embodiments appliances may intercept or snoop traffic flowing through a switch, for example, to detect or estimate the amount of traffic (i.e., bandwidth usage) that is associated with a user. Both downstream traffic and upstream traffic may be monitored. If upstream traffic is very high and downstream traffic is relatively low, then a system may target a person for another level of investigation by a redistribution detection system. Accordingly, volume-level analysis may be performed as a preliminary matter to detect possible redistributors of multimedia content. This volume-level analysis is conducted under the theory that a user having high-bandwidth usage is more likely to be redistributing multimedia content illegally than a user with low-bandwidth usage. Further, a user with high-bandwidth usage may be a repeat offender that might naturally be a first target of an investigation for detecting redistribution of multimedia content.

As shown in operation 203, a portion of monitored users that meet a predetermined condition or conditions is selected. In some embodiments, a volume of traffic for a plurality of users is monitored and for all users or for a portion of the plurality of users a volume parameter is ranked against other users. Users with high volume parameters or high bandwidth usage may be selected for further examination. The time of day may be considered in determining a user's volume parameter or parameters, and if a user has a high volume of upstream traffic when most other users have low volumes of traffic, the user may be flagged for further examination. An example predetermined condition for selection in operation 203 is ranking in the top $95^{th}$ percentile compared to other users with regard to upstream bandwidth traffic. The ratio of upstream traffic to downstream traffic may also be analyzed for conducting operation 203. Since volume level analysis may be processor or resource intensive, the amount of resources available for analysis may be considered when configuring a system to conduct volume-level analysis within a content provider network.

As shown in operation 205, for users selected in operation 203 based on volume-level analysis, content inspection of data traffic may be performed to determine whether data traffic includes illegally redistributed multimedia content. In some embodiments, a security parameter such as a watermark may be appended to packets that make up distributed content that is the subject of monitoring according to disclosed embodiments. A content signature module (e.g., content signature module 133 in FIG. 1) may be enabled for creating and attaching identification parameters, security identifiers, watermarks, and the like to one or more packets, frames, or datagrams (e.g., UDP datagrams) associated with tracked content. Popular movies-on-demand or pay-per-view sporting events may be targeted for marking and detection in accordance with operation 205. Channel changing parameters and ratings based systems may be used in determining multimedia content for marking and possible detection. In some embodiments, multimedia content may be marked when it is sent to a particular user who has been flagged in operation 203 as a potential redistributor of multimedia content. Multimedia content sent to the flagged user may contain a unique identifier or security feature to enable later tracking of the multimedia content if it is redistributed repeatedly.

In operation 207, an optional operation is performed for recording parameters regarding the frequency with which a user orders multimedia content. For example, if a user infrequently orders pay-per-view movies but often sends large volumes of traffic upstream, the user may be targeted as a redistributor of multimedia content. Operation 207 may optionally be performed before operation 205 or before operation 203 as a further factor in the selection process for users in need of analysis under operation 205. In this way, disclosed embodiments provide methods and systems for detecting distribution of multimedia content.

Figure 3:
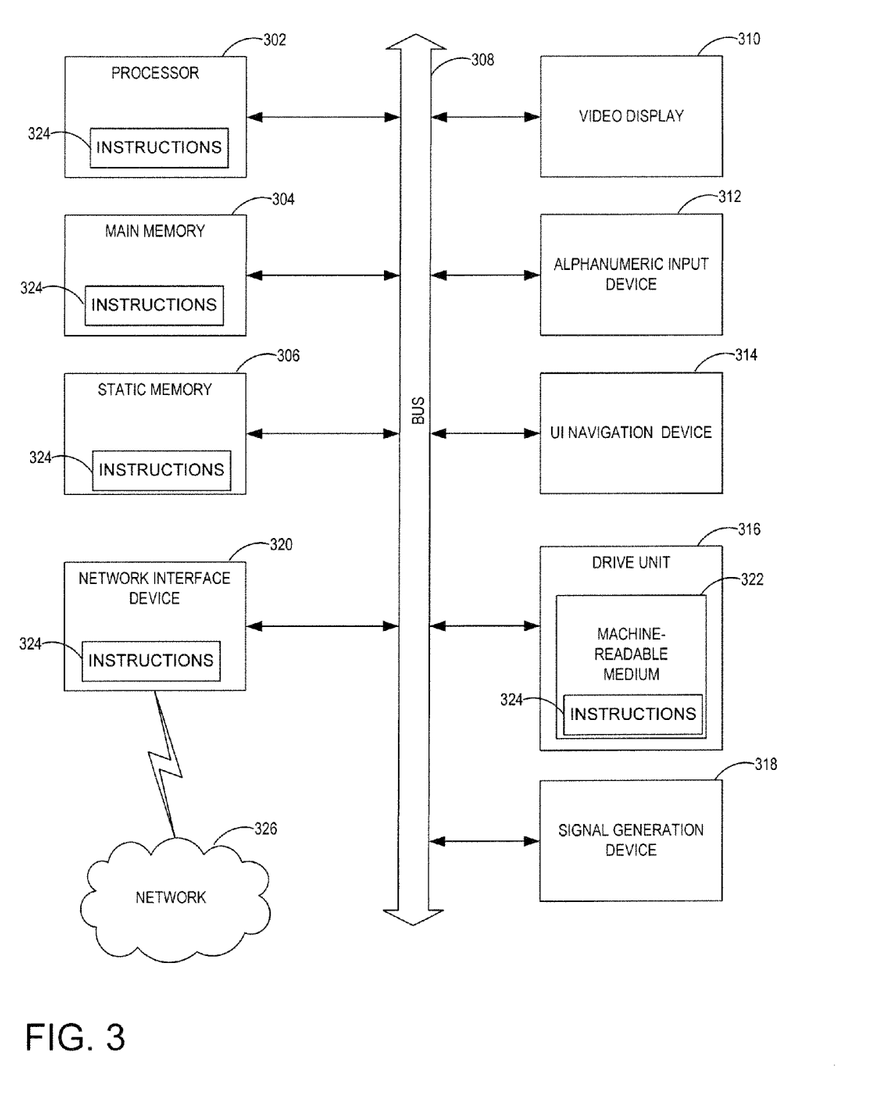
FIG. 3 depicts a data processing system in block diagram form that may be incorporated into disclosed embodiments.

FIG. 3 is a diagrammatic representation of a machine (i.e., data processing system) in the example form of a computer system 300 within which a set of instructions for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a DVR, a PC, a tablet PC, STB, a cable box, a satellite box, an electronic programming guide box, a Personal Digital Assistant (PDA), RG, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor 302 (e.g., a central processing unit (CPU), a graphics processing unit (GPU) or both), a main memory 304 and a static memory 306, which communicate with each other via a bus 308. The main memory 304 and/or the static memory 306 may be used to store the channel history data. The computer system 300 may further include a video display unit 310 (e.g., a television, a LCD or a CRT) on which to display broadcast or other programs, for example. The computer system 300 also includes an alphanumeric input device 312 (e.g., a keyboard or a remote control), a user interface (UI) navigation device 314 (e.g., a remote control, or a mouse), a disk drive unit 316, a signal generation device 318 (e.g., a speaker) and a network interface device 320. The alphanumeric input device 312 and/or the UI navigation device 314 (e.g., the remote control) may include a processor (not shown), and a memory (not shown). The disk drive unit 316 includes a machine-readable medium 322 on which is stored one or more sets of instructions and data structures (e.g., software 324) embodying or utilized by any one or more of the methodologies or functions described herein (e.g., the software to access the channel history data in the database 186). The software 324 may also reside, completely or at least partially, within the main memory 304 and/or within the processor 302 during execution thereof by the computer system 300.

The software 324 may further be transmitted or received over a network 326 (e.g., a television cable provider) via the network interface device 320 utilizing any one of a number of well-known transfer protocols (e.g., broadcast transmissions, HTTP). While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Disclosed embodiments are intended to detect illegal multimedia content redistribution that may occur in violation of copyright laws, for example. A content provider may have a large number of subscribers or users and detecting illegal or unauthorized distribution is a resource consuming process. Therefore, steps may be taken to increase the likelihood of detecting illegal distribution while minimizing the number of resources used. To this end, disclosed embodiments conduct volume-level pruning to narrow the pool of potential bad actors to a subset of the total number of subscribers or users. The volume-level pruning may be based on either upstream bandwidth usage, downstream bandwidth usage, or both.

Using disclosed embodiments, trends of upstream bandwidth usage by a particular user may be compared to other users. If a particular user's upstream bandwidth is significantly higher than other users' bandwidth usage, then the user may be flagged as a high-bandwidth user. In addition to detecting raw volume, disclosed embodiments may consider the time of day of the high-bandwidth usage. For example, if high-bandwidth usage occurs at a time when most people sleep (e.g., 3:00 a.m.), the content provider may also flag the user since it may be more likely that the user is downloading or uploading content for illegal purposes. Averaged upstream bandwidth usage may also be monitored by the day of the week and compared to other users. The subscriber's upstream bandwidth usage can be compared to other subscribers, and if the average upstream bandwidth usage of a subscriber is much higher than that of all other subscribers, or the average upstream bandwidth usage by day of week and time of day differs significantly from that of all other subscribers, the subscriber may be targeted for another layer of analysis such as content-level matching.

The specification and drawings are to be regarded in an illustrative rather than a restrictive sense. It should be evident that various modifications and changes may be made to disclosed embodiments without departing from the broader spirit and scope of the claimed subject matter.

What is claimed is:

1. A computer readable storage device including processor executable instructions, which when executed by a processor, cause the processor to perform operations comprising:
   identifying a user as a selected user based on current upstream data traffic volume of the user;

comparing a historical upstream traffic volume of the selected user and the current upstream traffic volume of the selected user; and when the current upstream traffic exceeds the historical upstream traffic volume, comparing identification information associated with the volume of traffic to known identification information.

2. The computer readable storage device of claim 1, wherein the comparing of identification information includes:

obtaining the known identification information from a content signature module.

3. The computer readable storage device of claim 2, wherein the known identification information includes watermark information indicative of a watermark.

4. The computer readable storage device of claim 1, wherein the operations include:

receiving an upstream data traffic indication from a residential gateway associated with the user.

5. The computer readable storage device of claim 1, wherein the operations include:

identifying the user as a multimedia content redistributor based the comparing of traffic volume and the comparing of identification information.

6. The computer readable storage device of claim 1, wherein comparing the historical upstream traffic volume is based in part on video-on-demand ordering history of the user.

7. The computer readable storage device of claim 1, wherein the operations include:

monitoring upstream data traffic volume and time of day information associated with the data traffic.

8. The computer readable storage device of claim 1, wherein the operations include:

monitoring downstream traffic volume associated with the user.

9. A data processing system, comprising:

a processor;

a computer readable storage medium, accessible to the processor, including processor executable instructions, which when executed by the processor cause the processor to perform operations comprising:

attaching content identifier information to multimedia content sent to a plurality of users;

identifying a selected user based on current upstream data traffic volume;

comparing a historical upstream traffic volume of the selected user and the current upstream traffic volume of the selected user; and when the current upstream traffic exceeds the historical upstream traffic volume and the selected user is one of the plurality of users, flagging the selected user as a content redistributor candidate.

10. The system of claim 9, wherein the operations include: inspecting the upstream data traffic volume for the content identifier information.

11. The system of claim 9, wherein the operations include: analyzing the ordering history to determine the historical upstream traffic volume.

12. The system of claim 9, wherein attaching the content identifier information includes:

placing a security identifier in a packet of the multimedia content.

13. The system of claim 9, wherein the multimedia content comprises user datagram protocol packets.

14. A method, comprising:

identifying a user as a selected user based on current upstream data traffic volume of the user;

comparing a historical upstream traffic volume of the selected user and the current upstream traffic volume of the selected user; and when the current upstream traffic exceeds the historical upstream traffic volume, comparing identification information associated with the volume of traffic to known identification information.

15. The method of claim 14, wherein the comparing of identification information includes:

obtaining the known identification information from a content signature module.

16. The method of claim 15, wherein the known identification information includes watermark information indicative of a watermark.

17. The method of claim 14, further comprising:

receiving an upstream data traffic indication from a residential gateway associated with the user.

18. The method of claim 14, further comprising:

identifying the user as a multimedia content redistributor based the comparing of traffic volume and the comparing of identification information.

19. The method of claim 14, wherein comparing the historical upstream traffic volume is based in part on video-on-demand ordering history of the user.

* * * * *